US008340802B2

(12) United States Patent  
Feldman

(10) Patent No.: US 8,340,802 B2
(45) Date of Patent: Dec. 25, 2012

(54) SYSTEMS AND METHODS FOR PRODUCING CLIP-ONS FOR A PRIMARY EYEWEAR

(76) Inventor: Zvi Feldman, Zoran (IL)

( * ) Notice: Subject to any disclaimer, the term of this patent is extended or adjusted under 35 U.S.C. 154(b) by 507 days.

(21) Appl. No.: 12/450,360

(22) PCT Filed: Jan. 28, 2008

(86) PCT No.: PCT/IL2008/000121
§ 371 (c)(1),
(2), (4) Date: Jul. 28, 2009

(87) PCT Pub. No.: WO2008/093332
PCT Pub. Date: Aug. 7, 2008

(65) Prior Publication Data
US 2010/0198381 A1    Aug. 5, 2010

Related U.S. Application Data

(60) Provisional application No. 60/887,159, filed on Jan. 30, 2007.

(51) Int. Cl.
*G06F 19/00* (2006.01)
*G02C 13/00* (2006.01)
(52) U.S. Cl. ........................... 700/117; 351/177

(58) Field of Classification Search ............. 700/97, 700/98, 117, 211; 359/455; 351/44, 41, 351/47, 159, 163, 177, 178
See application file for complete search history.

(56) References Cited

U.S. PATENT DOCUMENTS

| | | | | |
|---|---|---|---|---|
| 4,781,452 | A * | 11/1988 | Ace | 351/177 |
| 5,674,113 | A * | 10/1997 | Underwood | 451/237 |
| 6,427,350 | B1 * | 8/2002 | Asaoka et al. | 33/507 |
| 6,481,109 | B2 * | 11/2002 | Rarick et al. | 33/28 |
| 6,623,339 | B1 * | 9/2003 | Igarashi et al. | 451/42 |
| 6,692,127 | B2 * | 2/2004 | Abitbol et al. | 351/227 |
| 6,830,333 | B2 * | 12/2004 | Feldman et al. | 351/177 |
| 7,434,931 | B2 * | 10/2008 | Warden et al. | 351/204 |
| 7,845,797 | B2 * | 12/2010 | Warden et al. | 351/204 |
| 2003/0097741 | A1 * | 5/2003 | Feldman et al. | 29/26 A |
| 2004/0004633 | A1 * | 1/2004 | Perry et al. | 345/728 |
| 2006/0101629 | A1 * | 5/2006 | Kvartler et al. | 29/26 A |
| 2006/0118501 | A1 * | 6/2006 | Kvartler et al. | 211/85.1 |
| 2006/0120567 | A1 * | 6/2006 | Kvartler et al. | 382/111 |

* cited by examiner

*Primary Examiner* — Dave Robertson

(57) ABSTRACT

A method for providing data regarding a given primary eyewear to a remote data processing center where the data is processed to yield production instructions for producing a clip-on for the primary eyewear. The production instructions are provided to one or more remote production units. Preferably, the site providing data regarding the primary eyewear and the site for producing the secondary eyewear object are the same site.

23 Claims, 14 Drawing Sheets

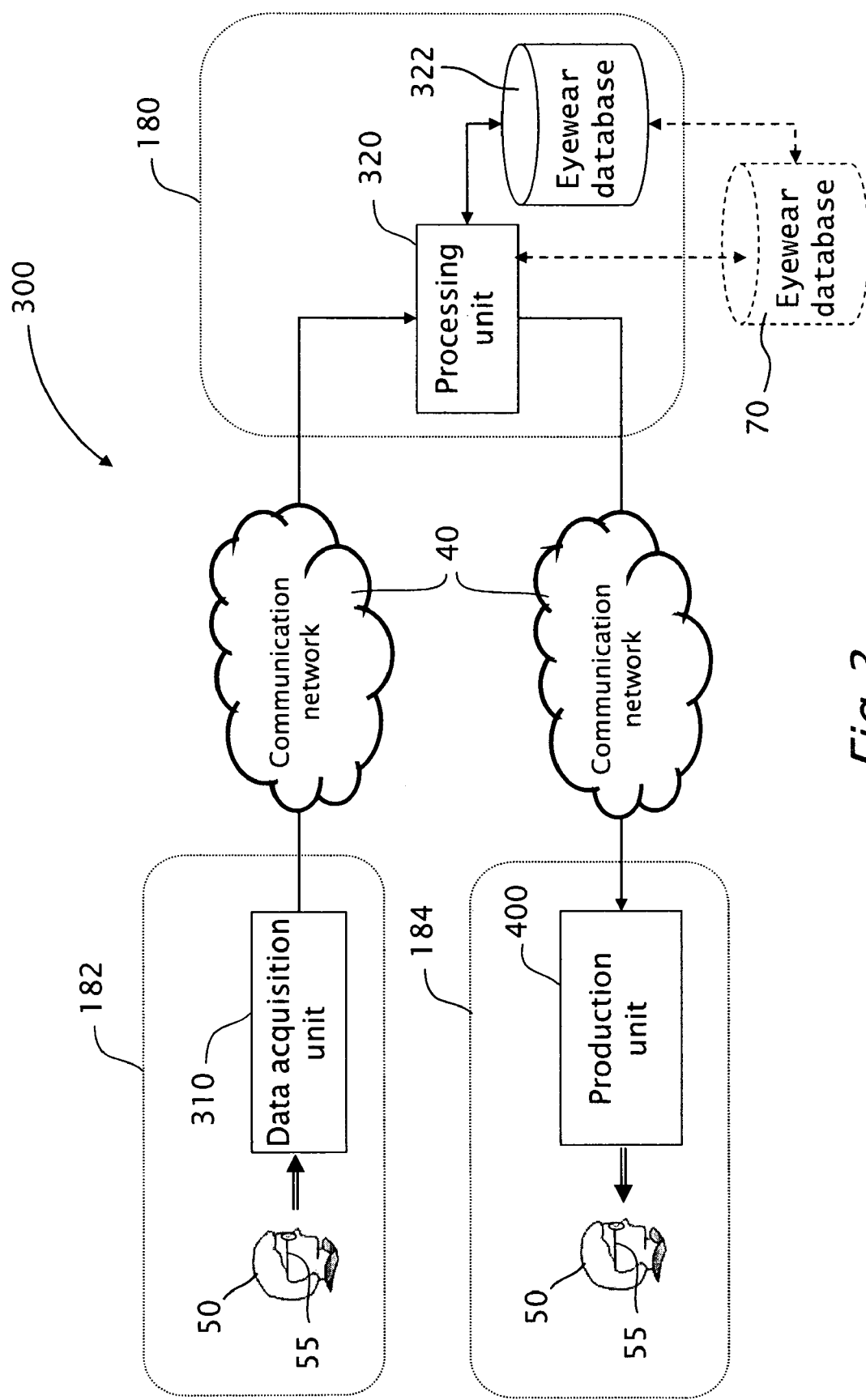

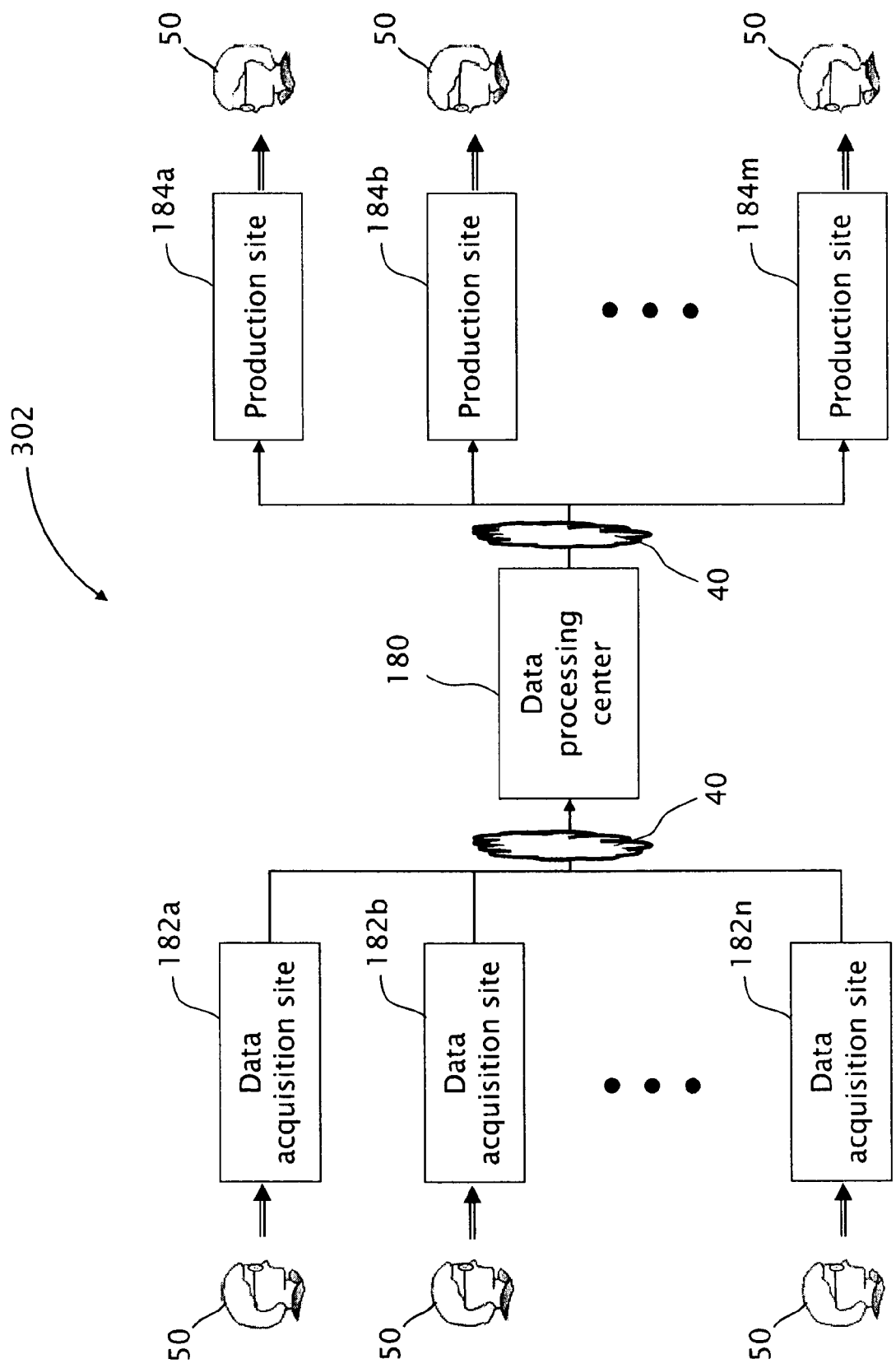

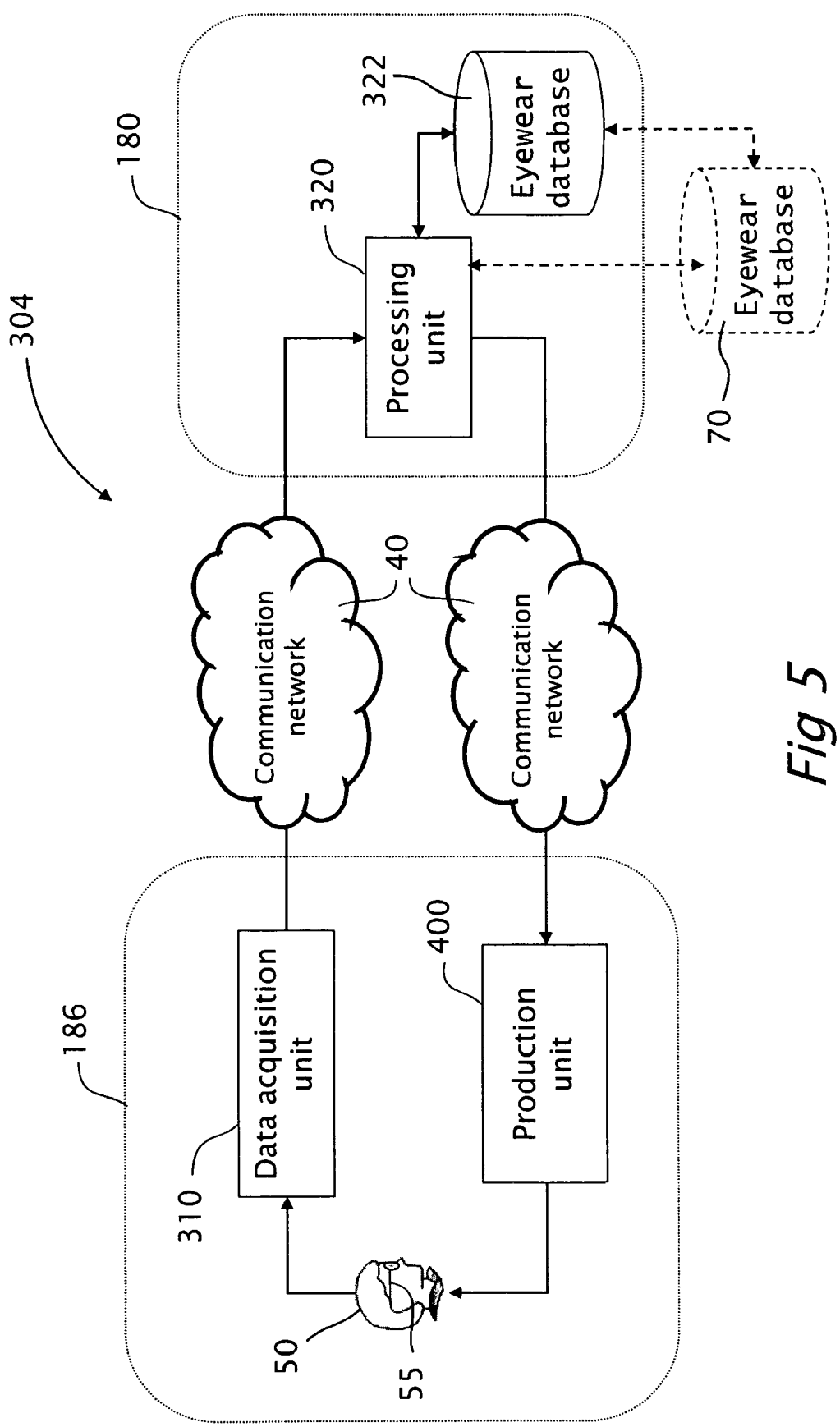

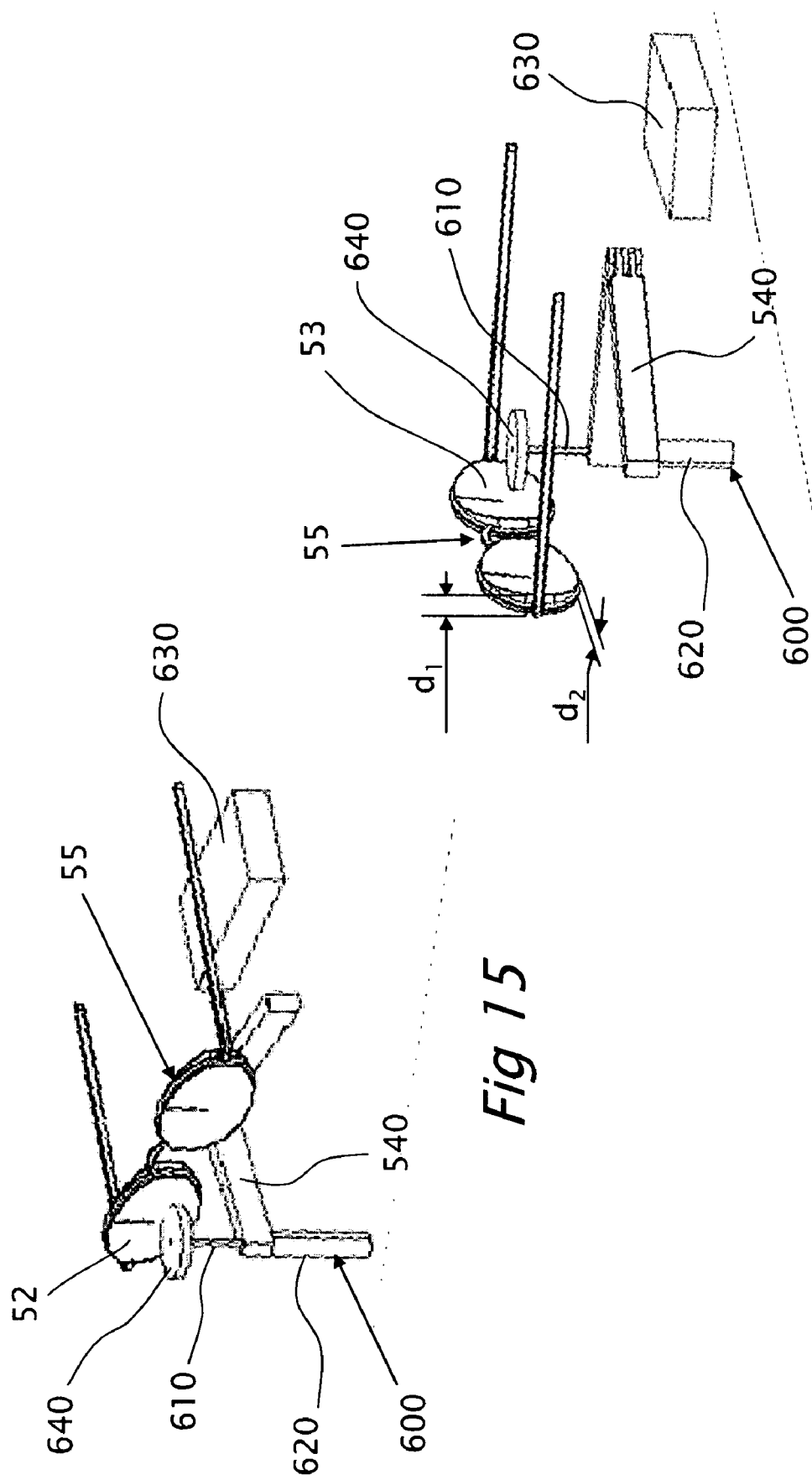

ively producing matching clip-ons to existing pairs of eyeglasses, whose performance depends critically upon operator skill and upon the accuracy of imaging means used.

SYSTEMS AND METHODS FOR PRODUCING CLIP-ONS FOR A PRIMARY EYEWEAR

CROSS REFERENCE TO RELATED APPLICATIONS

This application claims the benefit under 35 USC 371 from PCT application PCT/IL2008/000121 filed Jan. 28, 2008, and the benefit under 35 USC 119(e) from U.S. provisional application 60/887,159 filed Jan. 30, 2007, the disclosure of both applications are included herein by reference.

FIELD OF THE INVENTION

The present invention relates to eyewear production and particularly to a system and methods for producing secondary eyewear, such as clip-ons whose lenses are readily mountable onto the lenses of a primary eyeglasses and in registration with the primary eyeglasses frame.

Another application of the present invention is to produce frameless eyeglasses or sunglasses based on a scanned image. The image can be received from the scanning unit or from any other source.

BACKGROUND OF THE INVENTION

The need to protect our eyes from the sun rays has become more of an essential need than just comfort. On solution for people wearing eyeglasses is to attach sun protecting clip-ons to the eyeglasses. However, the endless number of eyeglasses shapes and sizes makes it difficult to match an off the shelf clip-on to a pair of eyeglasses.

The wide use of clip-on glasses in exemplary applications, such as sunglasses and enhancement eyewear, has spawned many methods for producing matching clip-ons to existing eyeglasses.

Prior art, such as US Patent application publications 2006/0120567 and 2006/0118501, include techniques and systems that rely mostly upon the experience and skill of the manufacturer and which entail shipping a finished matching clip-on product to the customer, a process that entails substantial effort in shipping and concomitant time delays.

One method for producing matching clip-ons is to send the primary eyeglasses to a clip-on laboratory. Such a method requires shipment of the eyeglasses back and forth as well as the clip-ons, causing the client to temporarily depart from his eyeglasses, which is typically inconvenient.

A second method requires the optician to acquire a device for producing clip-ons in the shop. In this approach the end result quality of the clip-ons depends on the skills and workmanship of the optician.

In a third approach, rather than sending the primary eyeglasses to a clip-on laboratory, data describing the primary eyeglasses is sent to the clip-on laboratory. The client gets to use the primary eyeglasses while waiting for the clip-ons to arrive from the clip-on laboratory, but still, the method requires shipping the produced clip-on, which involves cost and waiting time.

US patent application 2003/0101603, discloses a system for imaging a pair of eyeglasses and obtaining data indicative of the outline of the eyeglasses and designated locations associated with the outline. The system is useful for custom forming, on a non-industrial scale, clip-ons adapted to be used with eyeglasses. Referring to FIG. 1, a basic flow chart 11 of the steps of prior art clip-on production method, is shown. In step 10 the primary eyeglasses are imaged; the images are analyzed in step 20 whereas the analysis results are provided to a production machine, which produces the clip-on in step 30.

US patent applications 2006/0120567 ('567) and 2006/011850 include techniques and systems that rely mostly upon the experience and skill of the manufacturer in a production center. The method entails shipping the finished matching clip-on product to the customer, a process that entails substantial effort in shipping and concomitant time delays. The system provided by '567 is schematically shown in FIG. 2. System 90 includes an imager 62 disposed at site 60. System 90 further includes a processor 82 and a production machine 84, disposed at site 80, referred to as a "production center". Typically a customer 50 request the clip on at site 60 where customer 50 provides his eyeglasses (55) and then needs to wait for the clip-on to be produced and delivered to customer 50.

It should be noted that any misalignment between imager 62 and mounted eyeglasses 55 yield a distorted image of eyeglasses 55.

Thus there is a need for and it would be advantageous to have a method allowing a matching, producing and delivering of clip-ons for a given pair primary eyeglasses, whereas customer 50 does not have to wait for the delivery of the clip-ons. There is a further need to have an imaging method which is not sensitive to the alignment between imager 62 and mounted eyeglasses 55.

Embodiments of the present invention serve as improvements to matching clip-on manufacturing and manufacturing systems and methods, enabling more effective clip-on production and allowing lens cutting equipment to be situated in any locale, and not only in close proximity to the scanning, editing, and other lens/clip-on preparation equipment. Additionally or alternatively, embodiments of the present invention may be applied to manufacturing eyeglasses and lenses thereof, as described hereinbelow.

DEFINITIONS

The term "eyewear" is to be understood as eyeglasses, sunglasses, eyeglass frames, clip-on attachments for eyeglasses, and the like.

The term "primary eyeglasses" as used herein refers to a pair of eyeglasses serve as a reference for producing matching clip-ons or a secondary pair of eyeglasses. The primary eyewear can be any eyeglasses, prescription or non-prescription, which serve for clip-ons to be attached thereupon.

The terms "clip-on" and "clip-ons" as used herein refers to any optical add-ons mounted on a pair of primary eyewear.

The term "cutting a lens" as used herein refers to cutting any type of lens including lenses for optical eyewear, sunglasses, demo, Polaroid, etc.

SUMMARY OF THE INVENTION

The principle intentions of the present invention include providing a method for providing data regarding a given primary eyewear to a remote data processing center where the data is processed to yield production instructions for producing secondary eyewear. The production instructions are provided to one or more remote production units, the method including: (a) obtaining data defining the shape and size of the primary eyewear suitable for obtaining therefrom at least one geometric characteristic of the primary eyewear; (b) providing to the data processing center reference data associated with the primary eyewear, whereas the reference data represents at least one reference dimension; (c) transmitting the reference data, via an external communication means, to the data processing center; (d) generating at the data processing center production instruction data for producing secondary eyewear based on the received data defining the shape and size of the primary eyewear and the reference data; and (e) transmitting the production instruction data, via an external communication means, to a selected remote production unit for producing the secondary eyewear. Preferably, the site where the data defining the shape and size of the primary eyewear and the site for producing secondary eyewear object, are the same site.

It should be noted that typically, the secondary eyewear is a clip-on produced to attach to the primary eyewear. It should further be noted that production instruction data is typically provided as a computer file, readable by the remote production unit.

It should be noted that hereinafter in the specification and claims the term "remote", as it relates to a data processing center, is to be understood as at a site different from the scanning device and production device. Conversely, with regard to a scanning device, the term "remote" is to be understood as at a site different from the data processing center; and with regard to a production device, the term "remote" is to be understood as at a site different from the data processing center.

The term "external", as it relates to a communication means, refers to a third-party communication infrastructure, such as the PSTN, cellular communication backbone, the interne, or the like.

The term "semi finished lens" as used herein refers to a lens with finished, ready to use optical surface, being larger in size than the final lens, from which the final lens is cut.

The term "matching clip-on" as used herein refers to a clip-on produced from a file provided by the data processing center. It should be noted that the final shape of the clip-on may not necessarily match the shape of the primary eyeglass, but matching clip-ons generally are mounted to the primary eyeglasses in an integrative fashion.

The term "shape and size of the primary eyewear" as used herein refers to the information containing the details that reflect the placement between the two eye rims.

The data processing center includes a server and an eyewear database. The eyewear database may include multiple physical sub-databases, some of which may be located at the data processing center site, some maybe located at remote sites. The eyewear database may further be connected to remote databases, such as databases of eyewear makers. The eyewear database may include eyewear frames, frames of known make and model, data characterizing the geometrical structure of eyewear frames, data characterizing optical lenses for eyeglasses. For each frame entry, the eyewear database may further include data needed for producing a secondary eyewear for the frame entry, whereas the producing data is selected from the group including: cutting contours, attaching elements type, drilling size and location, bridge location and milling instruction for affixing elements for attaching the secondary eyewear to the primary eyewear.

An aspect of the present invention is to provide a system including a data processing center adapted to produce production instructions for producing secondary eyewear based on data defining the shape and size of the primary eyewear and reference data associated with primary eyewear. The system further includes a plurality of remote sites for obtaining data defining the shape and size of the primary eyewear. The system further includes a plurality of remote sites for producing secondary eyewear object mountable on the primary eyewear based on the production instruction data obtained from the data processing center. Preferably, a site for obtaining data defining the shape and size of the primary eyewear and a site for producing the secondary eyewear for the primary eyewear are the same site or nearby sites, for the primary eyewear owner convenience.

In embodiments of the present invention, the data defining the shape and size of the primary eyewear includes the make and model of the primary eyewear frame.

In embodiments of the present invention, the data defining the shape and size of the primary eyewear includes data defining the shape and size of the primary eyewear, is selected from an eyewear database, whereas the eyewear database is selected from the group consisting of: a computerized database, a printed database.

When using eyewear databases for defining the primary eyewear, generating the production instruction data at the data processing center includes the steps of: (a) providing an eyewear database at the data processing center; (b) extracting form the eyewear database at the data processing center specific data needed for producing the secondary eyewear, whereas the specific producing data is selected from the group including: cutting contours, attaching elements type, drilling size and location, bridge location and milling instruction for affixing elements for attaching the secondary eyewear to the primary eyewear; (c) optionally, the operator at the data processing center may edit the specific producing data, such as the type of attaching elements (used for attaching the secondary eyewear to the primary eyewear), data regarding drilling size and location, and milling instruction for the attaching elements; and (d) generating the production instruction data, whereas the instructions are selected from the group consisting of cutting instructions, attaching elements type, drilling instructions, bridge location, milling instructions.

In embodiments of the present invention, the data defining the shape and size of the primary eyewear includes the step of scanning the primary eyewear, whereas the data defining the shape and size of the primary eyewear is selected from the group including: one or more front view images, one or more segments outlining the outer contour of the frame, other data representing the frame local thickness, other data representing the curvature of the surfaces of a lens of the primary eyewear.

In embodiments of the present invention, the scanning of the primary eyewear includes the steps of: (a) placing the eyewear for scanning; (b) providing a moveable sensor for sensing spatial position, such as a digital stylus; (c) moving the sensor along at least a portion of the external edge of the frame of the primary eyewear, thereby creating a contour data segment, whereas the contour data segment includes location, size and shape data; and (d) recording the contour segment location, size and shape data. If more than one contour data segments are created, each contour data segment further includes distance data from adjacent contour data segment.

In embodiments of the present invention, the reference data, further includes data defining the distance between the lenses of the primary eyewear. The data defining the distance between the two lenses can be obtained from a reference point at the device holding the primary eyewear, from the front view image of the primary eyewear and/or from contour data segments operatively taken from each of the lenses, wherein the distance between the two contour data segments is measured and recorded.

In embodiments of the present invention, when using eyewear scanning for defining the primary eyewear, generating the production instruction data at the data processing center includes the steps of: (a) aligning the contour data segments with the front view image of the primary eyewear, whereas the alignment is performed using graphical processing manipulation on the front view image, and whereas the graphical processing is selected from the group of graphical actions including translation, scaling, rotation, skewing and any other graphical actions, thereby creating an aligned image of the primary eyewear; (b) manually completing the outline of the frame of the primary eyewear using the aligned image; (c) optionally, the operator at the data processing center may edit the specific producing data, such as the type of attaching elements (used for attaching the secondary eyewear to the primary eyewear), data regarding drilling size and location, and milling instruction for the attaching elements; and (d) generating the production instruction data, whereas the instructions are selected from the group consisting of cutting instructions, attaching elements type, drilling instructions, bridge location, milling instructions.

In embodiments of the present invention, when using eyewear scanning for defining the primary eyewear, generating the production instruction data at the data processing center includes the steps of: (a) providing a processing unit; (b) providing a database of eyewear frames; (c) providing at least one contour data segment, wherein the contour data segment defines at least one dimension of the frame of the primary eyewear, whereas the dimension is selected from the group consisting of: the height of the frame, the width of the frame, the width of the frame of a lens of the primary eyewear; (d) determining the dimension by the processing unit; (e) matching the location, size and shape of the at least one contour data segment with a database of frames defined by frame size and shape, whereas the match of the at least one contour data segment with each frame is graded; (f) computing a list of best matches, preferably in grading order, wherein the list length is delimited by a grade threshold, quantity of match, or any other method; (g) selecting, manually or automatically, the best match; (h) extracting form the eyewear database specific data needed for producing the secondary eyewear, such as cutting contours, attaching elements type, drilling size and location, bridge location and milling instruction for affixing elements for attaching the secondary eyewear to the primary eyewear; (i) optionally, manually editing data elements of the specific producing data selected from the group including: attaching elements type, drilling size and location, bridge location and milling instruction for affixing elements for attaching the secondary eyewear to the primary eyewear; and (j) generating the production instruction data, whereas the instructions are selected from the group consisting of cutting instructions, attaching elements type, drilling instructions, bridge location, milling instructions.

In embodiments of the present invention, the method for providing data regarding the primary eyewear to a remote data processing center further includes the step of providing data of other parts of the primary eyewear, whereas the parts are selected from the group including screws, a bridge and ornaments.

According to the teachings of the present invention, transmitting the reference data to the data processing center, and transmitting the production instruction data to a remote production unit, is performed by external communication means selected from the group including: electronic mail, computer network, facsimile machine, radio frequency (RF) devices such as cellular phones and Bluetooth, regular mail.

An aspect of the present invention is to provide a method for selecting semi finished lenses, attaching elements and the positioning of the attaching elements, for producing secondary eyewear attachable to primary eyewear, the method including the steps of: (a) obtaining data defining the thickness, the inner curvature and the outer curvature of the lenses and the curvature of the frame of the primary eyewear; (b) determining the thickness, the inner curvature, and the outer curvature of the lenses and the curvature of the frame of the primary eyewear; (c) selecting a semi finished lenses best matching the determined curvature of the lenses of the primary eyewear; and (d) selecting affixing elements for attaching the secondary eyewear, produced from the semi finished lenses, to the primary eyewear, and the positioning of the attaching elements.

In embodiments of the present invention, the method for determining the data defining the thickness, the inner curvature, and the outer curvature of the lenses and the curvature of the frame of the primary eyewear, includes the step of scanning the primary eyewear. The scanning provides data selected from the group including: one or more side view images from numerous positions around the frame of the primary eyewear frame, one or more segments outlining the curvature of the lenses and outer curvature of the lenses of the primary eyewear, other data representing the frame local thickness, other data representing the curvature of the surfaces of a lens of the primary eyewear.

In embodiments of the present invention, the scanning of the primary eyewear for selecting semi finished lenses includes the steps of: (a) placing the eyewear for scanning; (b) providing a moveable sensor for sensing spatial position, such as a digital stylus; (c) moving the sensor along at least a portion of each surface of a lens of the primary eyewear, thereby creating a curvature data segment, whereas the curvature data segment including the outer curvature and the local thickness of the lenses of the primary eyewear; and (d) recording the determined curvature data segments of the lenses of the primary eyewear.

In embodiments of the present invention, the scanning of the primary eyewear for selecting semi finished lenses includes the steps of: (a) placing the eyewear for scanning; (b) providing an image sensor for acquiring one or more image frames of the profile of each lens of the primary eyewear; (c) acquiring one or more image frames of the profile of each lens of the primary eyewear; (d) analyzing the image frames, thereby determining the outer curvature and the thickness of the lenses and the curvature of the frame of the primary eyewear; and (e) recording the determined outer curvature and the local thickness of the lenses of the primary eyewear.

It should be noted that the data defining the shape and size of the primary eyewear is adapted to be manipulated at least at the data processing center so that the secondary eyewear will be produced having shape and size adaptive to the shape, curvature and size of the primary eyewear.

An aspect of the present invention is to provide a method for producing a secondary eyewear object mountable on a primary eyewear, the method including the steps of: (a) obtaining a production instruction data from a data processing center; and (b) cutting a semi finished lens based on the production instruction data; and optionally, (c) drilling holes as required in the semi finished lens, based on the production instruction data.

An aspect of the present invention is to provide a platform, adapted to hold primary eyewear and a scanning device, such that data defining the shape and size of at least a portion of the primary eyewear can be obtained. The portion of the primary eyewear is preferably a portion of the external outline of the frame of the primary eyewear. The platform is used at a site remote from a data processing center adapted to produce a production instruction data for producing secondary eyewear based on data defining the shape and size of the primary eyewear and reference data associated with primary eyewear.

The scanning device is preferably a digital stylus type sensor, whereas when moving the stylus on the primary eyewear, the stylus transmits spatial location and orientation data to a recording device operatively connected to the stylus.

An aspect of the present invention is to provide a device, at a site remotely located with respect to the data processing center, adapted to hold primary eyewear and a scanning device and to produce secondary eyewear from semi finished lens.

An aspect of the present invention is to provide a method for scanning portions of eyewear and thereby creating an eyewear database, the method including the steps of: (a) placing the eyewear for scanning; (b) providing a moveable sensor, such as a digital stylus, capable of sensing spatial position; (c) moving the sensor along at least a portion of the external edge of the frame of the primary eyewear, thereby creating a contour data segment, whereas the contour data segment includes location, size and shape data; and (d) recording the contour segment location, size and shape data. When more than one contour data segment is created, each contour data segment further includes distance data from adjacent contour data segment.

In embodiments of the present invention, the digital stylus senses two dimensional spatial position and the orientation of the sensor is selected from the group including horizontal and vertical. In other embodiments of the present invention, the digital stylus senses three dimensional spatial.

An aspect of the present invention is to provide a method for editing scanned data of primary eyewear for generating production instructions of a secondary eyewear object for the primary eyewear, the method including the steps of: (a) providing a scanning unit to obtains data defining the shape and size of the primary eyewear suitable for obtaining therefrom at least one geometric characteristic of the primary eyewear; and (b) providing a processing unit for processing the reference data associated with the primary eyewear and thereby generating production instructions of secondary eyewear object for the primary eyewear.

In the a method for editing scanned data of primary eyewear for generating production instructions of a secondary eyewear object for the primary eyewear, the data defining the shape and size of the primary eyewear is selected from the group including: one or more front view images, one or more segments outlining the outer contour of the frame, other data representing the frame local thickness, other data representing the curvature of the surfaces of a lens of the primary eyewear. The processing of the reference data associated with the primary eyewear, includes the steps of: (a) providing a database of eyewear frames; (b) providing at least one contour data segment, whereas the contour data segment defines at least one dimension of the frame of the primary eyewear, whereas the dimension is selected from the group consisting of: the height of the frame, the width of the frame, the width of the frame of a lens of the primary eyewear; (c) determining the dimension by the processing unit; (d) matching the location, size and shape of at least one contour data segment with a database of eyewear frames defined by frame size and shape, whereas the match of the at least one contour data segment with each frame is graded; (e) providing a list of the best matches, preferably in grading order, wherein the list length is delimited by a grade threshold, quantity of match, or any other method; and (f) manually or automatically selecting the best match.

In embodiments of the present invention, the database of eyewear at the data processing center, includes eyewear frame entries of frames having one constant dimension and a scaling parameter associated with that dimension. The dimension is selected from the group consisting of: the height of the frame, the width of the frame, the width of the frame of a lens of the primary eyewear. After extracting a matched frame, the dimensions of the extracted frame are manipulated according to the scaling associated with the extracted frame.

The present invention has several advantages, among which is the possibility of producing custom eyewear, such as clip-ons, made to be used with primary eyewear such as eyeglasses, without requiring a customer to be depended on shipping logistics of the custom eyewear from the production center. A system or network including a data processing center, a plurality of remote sites provided with means for obtaining data defining the shape and size of the primary eyewear, and a plurality of remote sites for producing the custom eyewear, enabling a customer to have his eyeglasses scanned at a site convenient to the customer and pick the custom made eyewear at a location convenient to the customer. Preferably the scanning site and the pick up site are the same site, for the convenience of the customer.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein:

FIG. 3 is a block diagram of clip-on production system, according to embodiments of the present invention, including a data processing center, a remote scanning site and a remote production site FIG. 4 is a block diagram of clip-on production system, according to embodiments of the present invention, including a data processing center, multiple remote scanning sites and multiple remote production sites.

FIG. 5 is a block diagram of clip-on production system, according to embodiments of the present invention, whereas the scanning site and the production site are the same remote site.

FIG. 15 illustrates the digital stylus shown in FIG. 9, sensing the outer curvature of a lens of the primary eyewear.

FIG. 16 illustrates the digital stylus shown in FIG. 9, sensing the inner curvature of a lens of the primary eyewear.

DETAILED DESCRIPTION OF THE INVENTION

Figure 2:
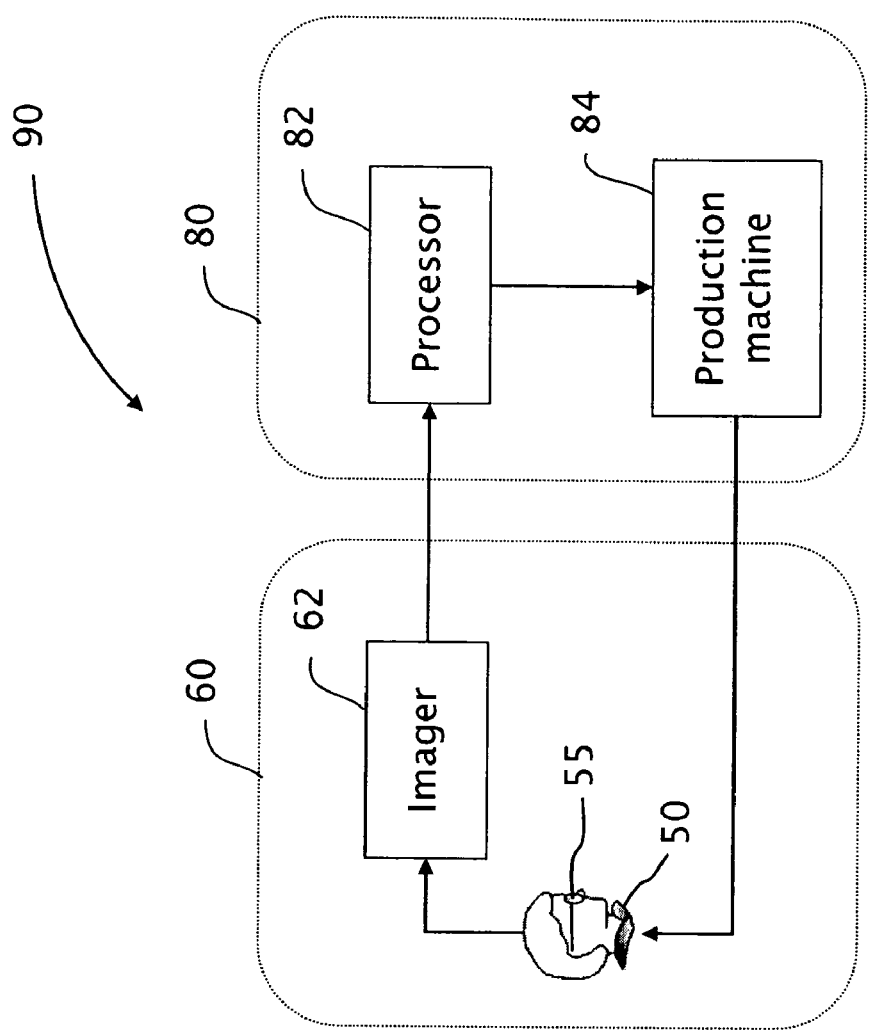
FIG. 2 (prior art) is a block diagram of prior art clip-on production system.
Figure 1:
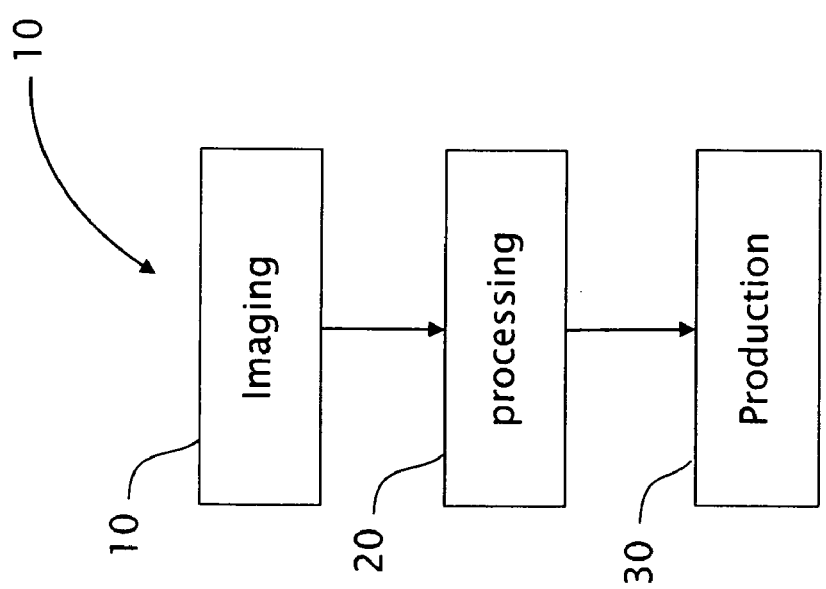
FIG. 1 (prior art) is a flow chart of the steps of prior art clip-on production method.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

By way of introduction, the principle intention of the present invention includes providing a method for providing data regarding a given primary eyewear to a remote data processing center where the data is processed to yield production instructions for producing a clip-on for the primary eyewear. The production instructions are provided to one or more remote production units. Preferably, the site providing data regarding the primary eyewear and the site for producing the secondary eyewear object are the same site.

Reference is now made to FIG. 3, which is a block diagram of clip-on production system 300, according to embodiments of the present invention. System 300 includes data processing center 180, a remote data acquisition site 182 and a remote production site 184, whereas processing center 180, communicates with remote data acquisition site 182 and a remote production site 184 over external communication means 40. Remote data acquisition site 182 provides data regarding a given primary eyewear to remote data processing center 180, where the data is processed to yield production instructions for producing a clip-on for the primary eyewear. Data processing center 180 then provides production instructions to remote production site 184. Reference is also made to FIG. 4, which is a block diagram of clip-on production system 302, according to embodiments of the present invention. System 302 includes data processing center 180, multiple remote data acquisition sites 182 and multiple remote production sites 184. Each remote site (182, 184) communicates with data processing center 180 over external communication means 40.

Figure 6:
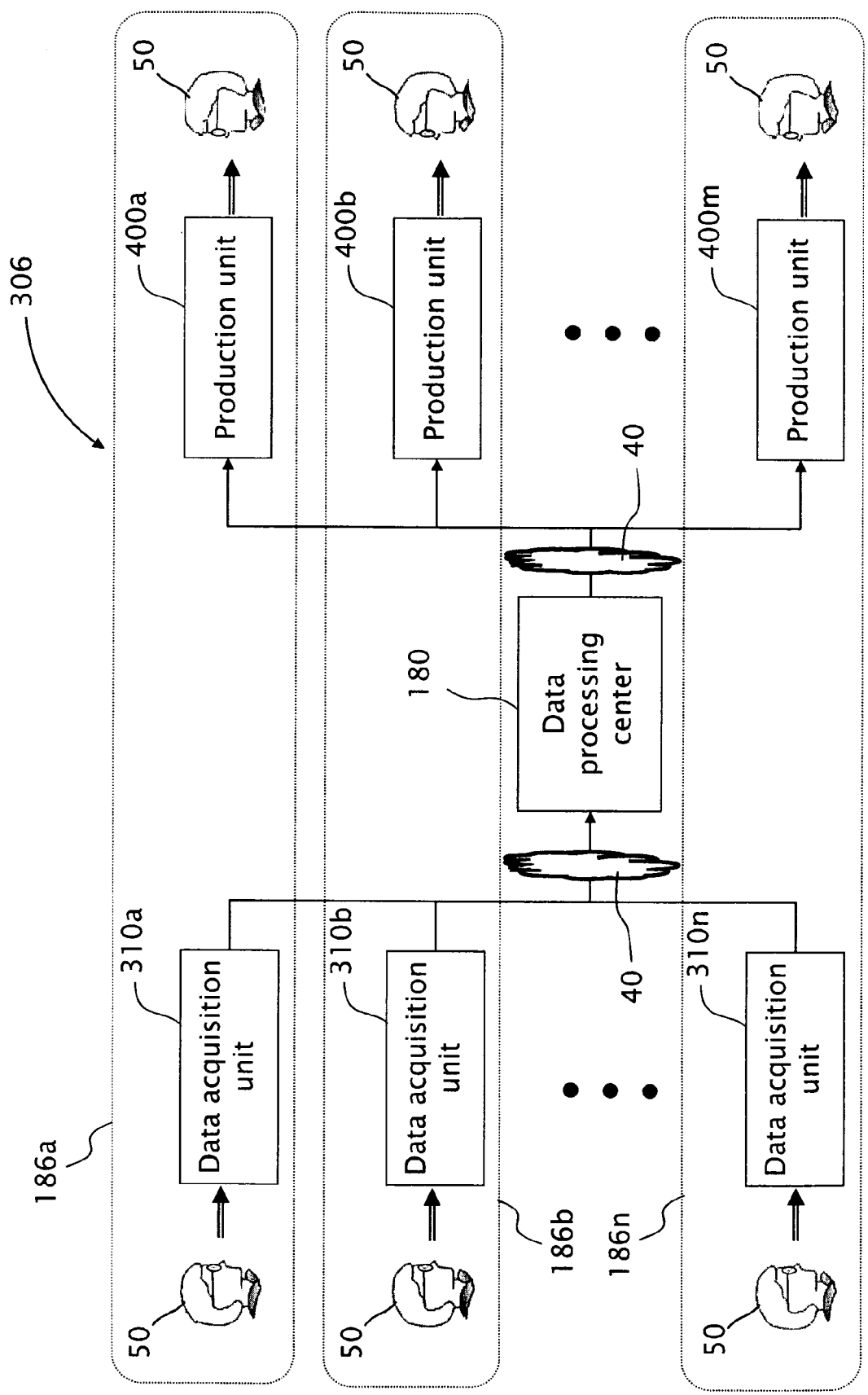
FIG. 6 is a block diagram of clip-on production system, according to embodiments of the present invention, including a data processing center, multiple sites including a scanner/identifier and a production machine.

In preferred embodiments of the present invention, remote data acquisition sites 182 and remote production sites 184 are the same site. FIG. 5 is a block diagram of clip-on production system 304, according to embodiments of the present invention, whereas data acquisition unit 310 and production unit 400 are at the same remote site 186. Reference is also made to FIG. 6, which is a block diagram of clip-on production system 306, according to embodiments of the present invention. System 306 includes data processing center 180 and multiple sites 186, each of which includes including a data acquisition unit 310 and a production unit 400.

Figure 7:
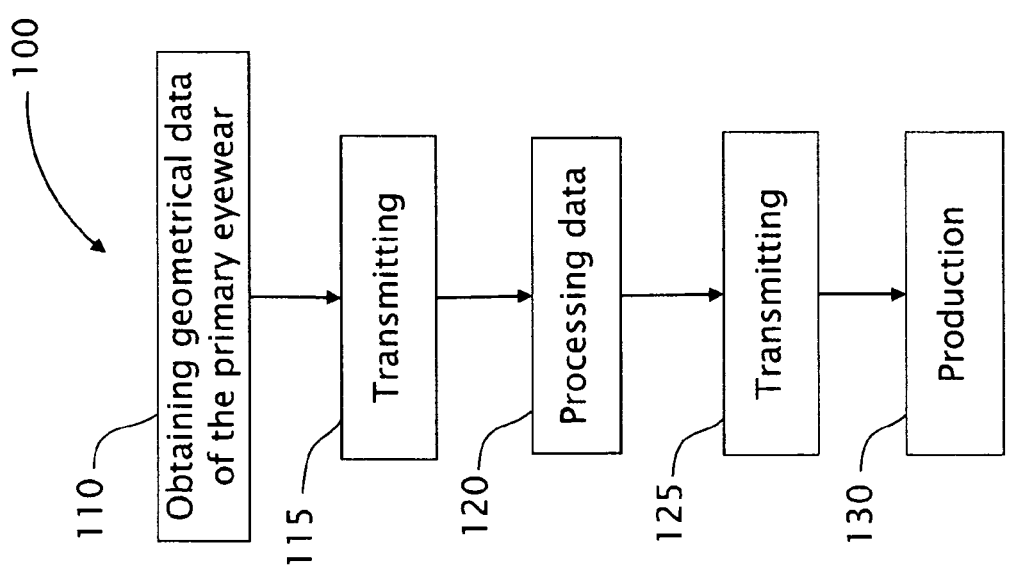
FIG. 7 is a flow chart of the steps of a clip-on production method, according to embodiments of the present invention.

Reference is now made to FIG. 7, which is a flow chart of the steps of a clip-on production method 100, according to embodiments of the present invention. Method 100 includes the following steps:

Step 110: obtaining geometrical data of primary eyewear 55.
Obtaining, remote data acquisition sites 182, data defining the shape and size of primary eyewear 55 suitable for obtaining therefrom at least one geometric characteristic of primary eyewear 55. The objective of step 110 is to define the frame and lenses of primary eyewear 55, such that data processing center 180 will have sufficient information to produce a secondary eyewear for primary eyewear 55. The data defining the shape and size of primary eyewear 55 can be:
a) Make and model of the frame of primary eyewear 55.
b) If primary eyewear 55 is prescription eyeglasses the prescription details of each lens.
c) An eyewear database, selected from the group consisting of: a computerized database, a printed database. The frame is selected from the eyewear database at data acquisition site 182.
d) Scanning primary eyewear 55 to obtain spatial geometrical characteristic of primary eyewear 55.

Step 115: transmitting reference data to processing center 180.
Providing to the data processing center reference data associated with the primary eyewear, whereas the reference data represents at least one reference dimension. Typically, the reference data is transmitted to data processing center 180 via an external communication means 40. External communication means 40 is selected from the group including: electronic mail, computer network, facsimile machine, radio frequency (RF) devices such as cellular phones and Bluetooth, regular mail.

Step 120: processing reference data.
Generating, at data processing center 180, production instruction data for producing secondary eyewear, based on the data defining the shape and size of primary eyewear 55 and the reference data, received from remote data acquisition site 182. The production instruction data can be operatively produced in several methods, depending on the type of reference data received:
a) Extracting the production instruction data from an eyewear database, at data processing center 180.
b) Aligning contour data segments with a front view image frame of primary eyewear 55. The alignment is performed by applying graphical processing manipulation tools on the front view image frame, thereby creating a non-distorted image of primary eyewear 55. The production instruction data is then derived from the non-distorted image of primary eyewear 55.
c) Matching contour data segments with an eyewear database, at data processing center 180. The production instruction data for the best match is then extracted from the eyewear database.

Step 125: transmitting production instruction data to processing center 180.

Transmitting the production instruction data by processing center 180 to a selected remote production unit 400, via an external communication means 40. External communication means 40 is selected from the group including: electronic mail, computer network, facsimile machine, radio frequency (RF) devices such as cellular phones and Bluetooth, regular mail.

Step 130: producing the secondary eyewear.

Producing the secondary eyewear at a selected remote production site, based on the production instruction data received from data processing center 180. The production instruction data include selection of the semi finished lenses, cutting instruction of the semi finished lenses, drilling instructions, milling instruction, assembly instructions, etc.

Figure 8:
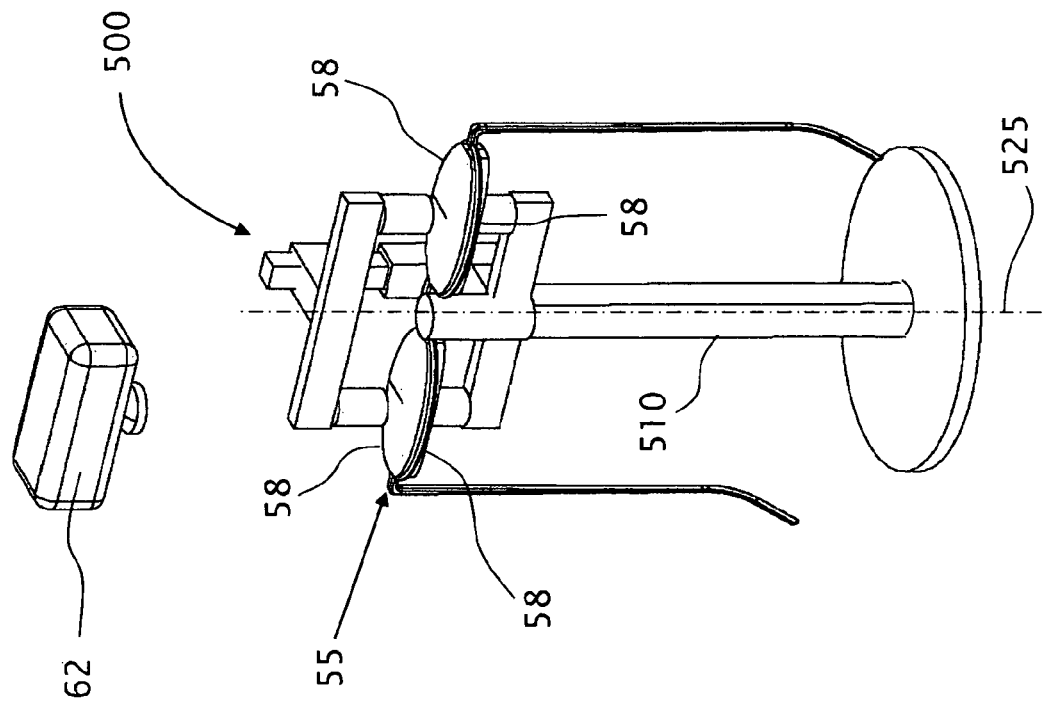
FIG. 8 illustrates a platform for holding the primary, according to embodiments of the present invention, with a camera disposed to acquire front view images of the primary eyewear.
Figure 9:
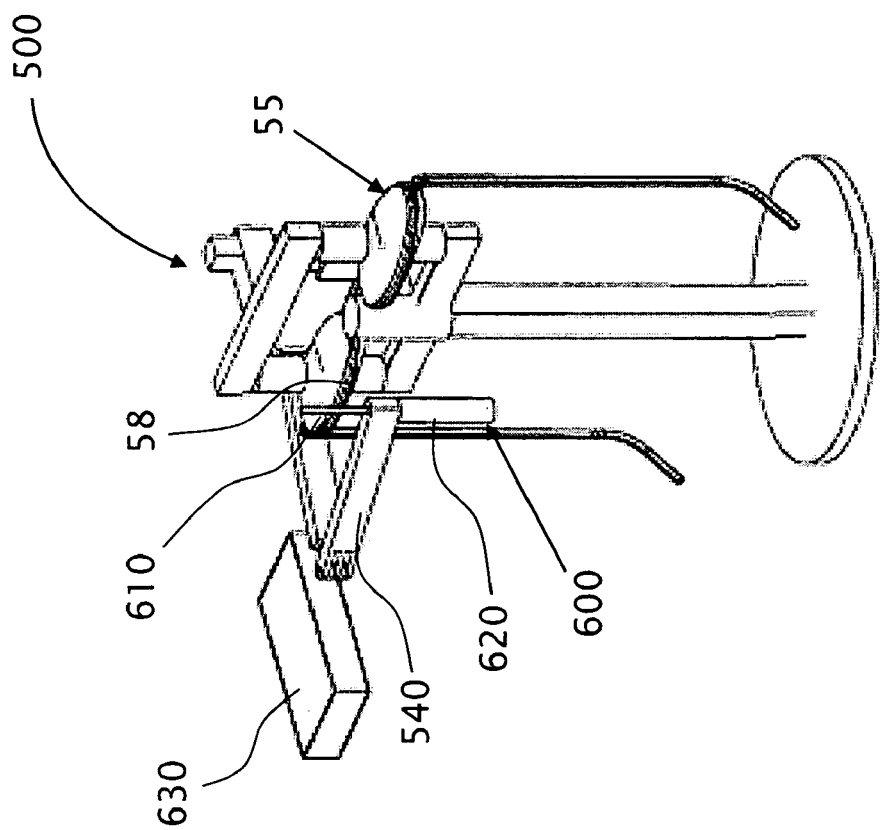
FIG. 9 illustrates the platform for holding the primary eyewear shown in FIG. 8, with a digital stylus sensing the outer edges of the frame of the primary eyewear.
Figure 10:
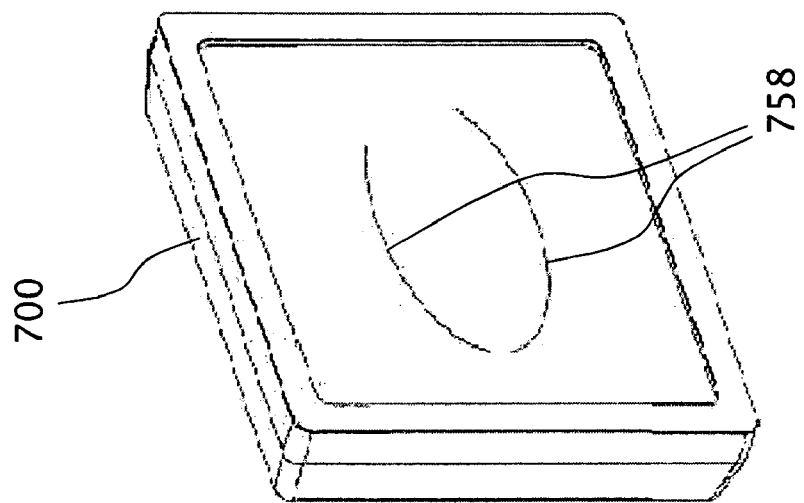
FIG. 10 illustrates an example display showing the contours segments acquired by the digital stylus shown in FIG. 9.

As described hereinabove, the type of geometrical data of primary eyewear 55 is selected at remote data acquisition site 182, in step 110. The type of data defining the shape and size of primary eyewear 55 can be:

a) Make and model of the frame of primary eyewear 55. Based on the make and model of the frame, production instruction data can be extracted at data processing center 180 from a make and model eyewear database.

b) If primary eyewear 55 is prescription eyeglasses the prescription details of each lens. Based on the prescription details, curvature data of the lens can be derived at data processing center 180 and thereby a proper semi finished lens can be made.

c) An eyewear database, selected from the group consisting of: a computerized database, a printed database. Based on the frame selection made at data acquisition site 182, production instruction data can be extracted at data processing center 180 from an eyewear database.

d) Scanning primary eyewear 55 to obtain spatial geometrical characteristic of primary eyewear 55. Several scanning activities can be performed at data acquisition site 182:

i) Front view imaging of primary eyewear 55. Reference is now made to FIG. 8, which illustrates platform 500 for holding primary eyewear 55, according to embodiments of the present invention, with camera 62 disposed to acquire front view images of primary eyewear 55. No harsh spatial alignment constrains are applied, except for appropriate focal distance, as distortion corrections will be made at data processing center 180. The acquired image frame should include all outer edges 58 of the frame of primary eyewear 55. Preferably, the spatial position of axis 525 of post 510 is known. Primary eyewear 55 is disposed and held such that the centers of the two lenses of the primary eyewear 55 are disposed symmetrically about axis 525.

ii) Acquiring contours segments of the frame of primary eyewear 55. Reference is now made to FIG. 9, which illustrates platform 500 for holding primary eyewear 55, including digital stylus 600 sensing outer edges 58 of the frame of primary eyewear 55. Stylus 600 includes body 620 and tip 610, which includes a spatial positioning sensor. Stylus 600 further includes a data transmitter (not shown) and a coupled receiver 630, capable of recording the received spatial positioning data or transmitting the spatial positioning data to a recording device such as a computer hard disc, recording CD/DVD or any other recording device. Using motion and orientation mechanism 540, stylus tip 610 is moved along at least a portion of outer edges 58 of the frame of primary eyewear 55, whereas the spatial positioning of stylus tip 610 is continuously recording. When more than one contour data segment is created, each contour data segment further includes distance data from adjacent contour data segment. Reference is also made to FIG. 10, which illustrates an example display 700 showing contour segments 758 acquired by digital stylus 600. The recorded contour segments are then transmitted to processing center 180 in Step 115.

It should be noted that stylus 600 is held in a known orientation, typically vertical or horizontal. The following of edges 58 can be done manually, mechanically, electro-mechanically or in a computerized process, directly or by coping accessories such as "pantograph" to transfer the movement to more convenience location.

Figure 11:
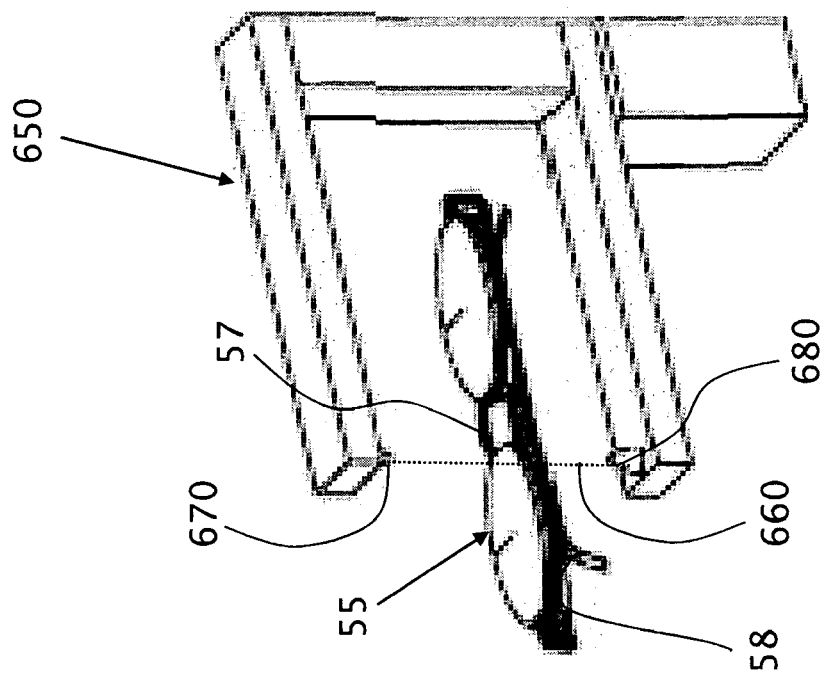
FIG. 11 (prior art) illustrates a laser scanner the frame of the primary eyewear.
Figure 12:
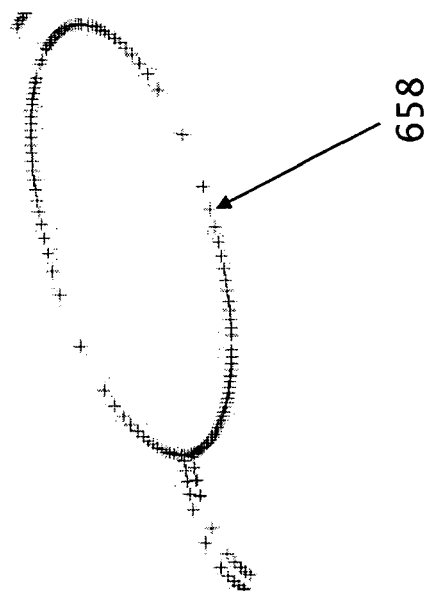
FIG. 12 illustrates an example display showing the contours segments acquired by the scanner shown in FIG. 11.

It should further be noted that the spatial distance of the contour segments to axis 525 are also provided to processing center 180 in step 115.

iii) Stylus 600 can be part of a digitizer that "translates" the movement into location, shape and size. The digitizer can be a product such as: "wacom tablet", "note taker", touch screen, light pen, etc. The digitizer can be made from 2 encoders that write the movement in X & Y axes for the coordinate data.

iv) Scanning the frame of primary eyewear 55 with a "light curtain" device, typically including multiple parallel light beams, whereas each beam includes a respective receiver. Reference is now made to FIG. 11, which illustrates a prior art laser scanner 650 scanning the frame of primary eyewear 55. FIG. 12 illustrates an example display showing contours 658 acquired by laser scanner 650. Primary eyewear 55 is positioned between respective beam sources 670 and receivers 680. Relative controlled movement between the eyewear 55 and the light beams 660 and respective sensors 680 yields an edge line determination based on respective beams being blocked by eyewear 55. The sensors 680 in such an arrangement may be a single sensor or an integrated line of sensors or a grouping of individual sensors in line. It should be noted that the laser scanner is given by way of example only, and any other optical, RF or other scanner types can be used.

In embodiments of the present invention, scanning step 110 is used independently to build an eyewear database such as eyewear database 322.

Figure 13:
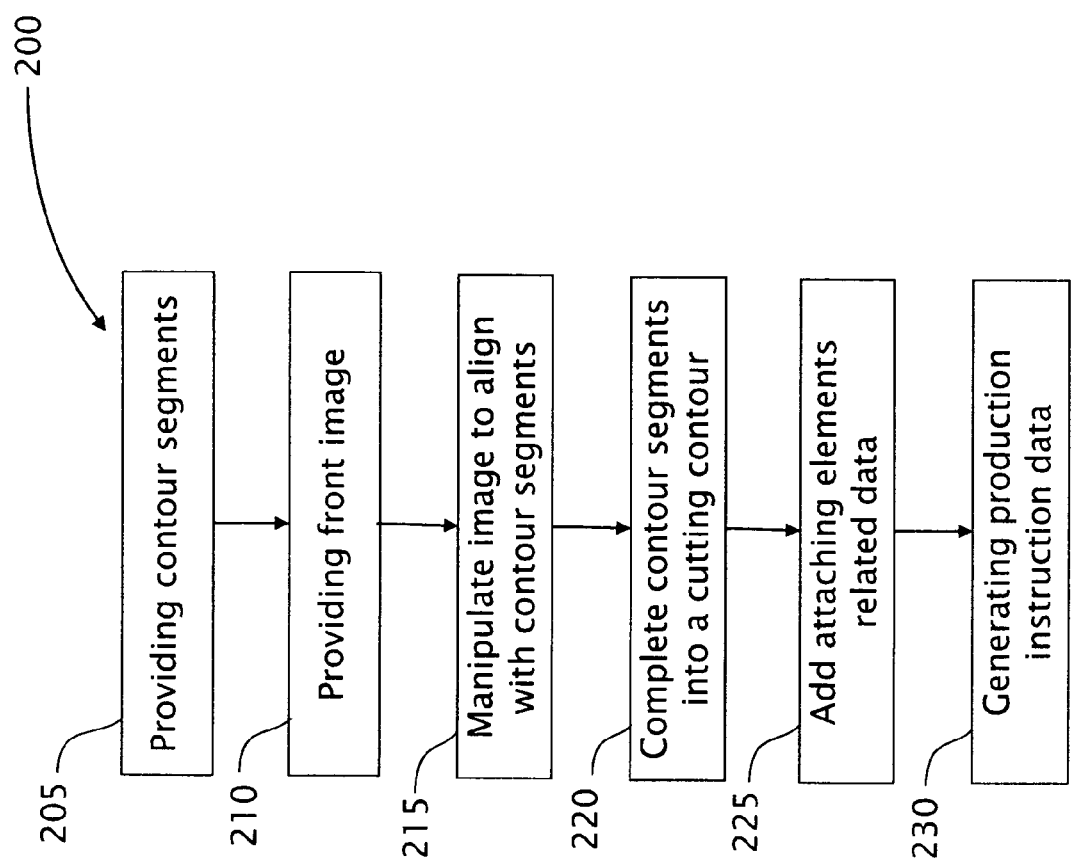
FIG. 13 is a flow chart of the steps of an alignment method, according to embodiments of the present invention.

As described hereinabove, the processing of the reference data in step 120 depends on the type of reference data received:

a) Upon receiving make and model of primary eyewear 55, or upon receiving an eyewear database selection, the action taken at data processing center 180 is extracting the production instruction data from eyewear database 322 and/or eyewear database 70.

b) Upon receiving contour segments representing at least a portion of outer edges 58 of the frame of primary eyewear 55, and receiving at least one front view image frame of primary eyewear 55, an alignment process can be performed. Reference is now made to FIG. 13, which is a flow chart of the steps of an alignment method 200, according to embodiments of the present invention. Alignment method 200 of includes the following steps:

Step 205: providing contour segments by remote data acquisition site 182 to data processing center 180.

Providing contour segments representing at least a portion of outer edges 58 of the frame of primary eyewear 55. The contour segments are assumed to be accurate with respect to the dimensions of primary eyewear 55.

Step 210: providing front view image frame by remote data acquisition site 182 to data processing center 180.

Providing at least one front view image frame of primary eyewear 55, which is assumed to be distorted.

Step 215: manipulate the image frame to align with the contour segments.

The contour front view image frame of primary eyewear 55 is manipulated to align with data segments. The alignment is performed by applying graphical processing manipulation tools on the front view image frame, thereby creating a non-distorted image of primary eyewear 55. The production instruction data is then derived from the non-distorted image of primary eyewear 55.

Step 220: complete contour segments into a cutting contour.

Manually combining the contour segments into a complete cutting contour, by overlaying the contour segments over the non-distorted image of primary eyewear 55, and following the outer edges of the image of the frame of primary eyewear 55.

Step 225: add attaching elements related data.

The operator at data processing center 180 can add attaching elements related data, such as attaching elements type, drilling size and location, bridge location and milling instruction for affixing elements for attaching the secondary eyewear to primary eyewear 55.

Step 230: generating production instruction data.

Figure 14:
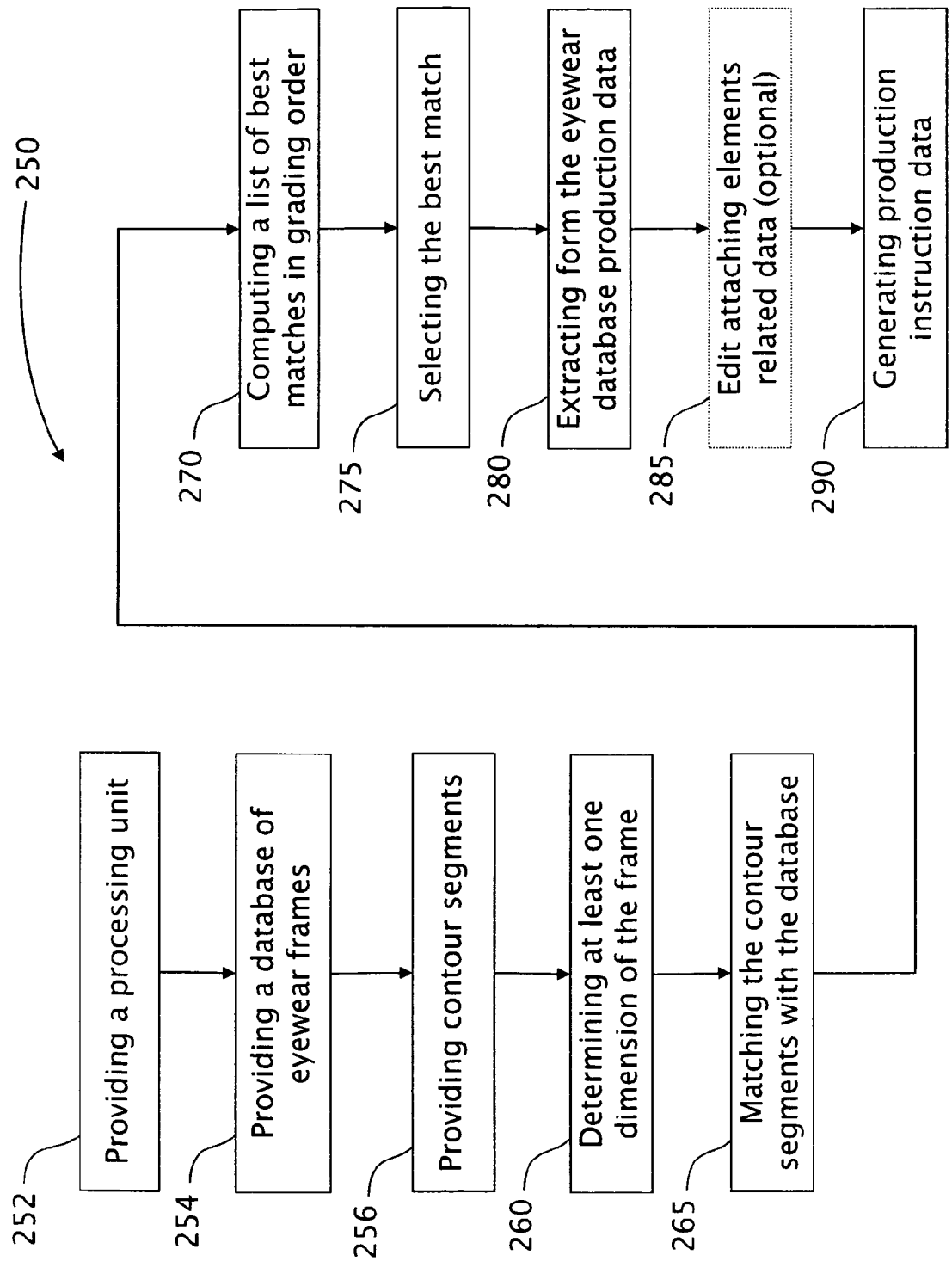
FIG. 14 is a flow chart of the steps of a matching method, according to embodiments of the present invention.

Generating production instruction data in a form suitable for use by the production unit at the selected remote production site 184.

c) Matching contour data segments with an eyewear database, at data processing center 180. The production instruction data for the best match is then extracted from the eyewear database. Reference is now made to FIG. 14, which is a flow chart of the steps of a matching method 250, according to embodiments of the present invention. Matching method 250 of includes the following steps:

Step 252: providing processing unit 320 at data processing center 180.

Providing processing unit 320 at data processing center 180 for perform the matching activity.

Step 254: providing database 322 of eyewear frames at data processing center 180.

Providing database 322 of eyewear frames at data processing center 180 for perform the matching activity. Optionally, an external eyewear database can be provided to processing center 180, such as database 70.

Step 256: providing contour segments by remote data acquisition site 182 to data processing center 180.

Providing at least one contour segment representing at least a portion of outer edges 58 of the frame of primary eyewear 55. The contour segments are assumed to be accurate with respect to the dimensions of primary eyewear 55. The at least one contour data segment must include at least one dimension of the frame of primary eyewear 55, whereas the dimension is selected from the group consisting of: the height of the frame, the width of the frame, the width of the frame of a lens of primary eyewear 55.

Step 260: determining at least one dimension of the frame.

Determining the at least one dimension of the frame as disclosed in step 256.

Step 265: matching the contour segments with frame entries in eyewear database 322 at data processing center 180.

Matching the location, size and shape of the at least one contour data segment with frame entries in eyewear database 322 of frames, defined by frame size and shape. The matching process assigns a grade reflecting the similarity ration of the contour segments with each entry in the eyewear database 322.

Step 270: Computing a list of best matches in grading order.

Computing a list of best matches, preferably in grading order, whereas the list length is delimited by a grade threshold, quantity of match, or any other method.

Step 275: Selecting the best match.

The best match is selected manually, by the operator, or automatically by processing unit 320.

Step 280: Extracting form production instruction data from eyewear database 322.

Extracting form eyewear database 322 specific data needed for producing the secondary eyewear, such as cutting contours, attaching elements type, drilling size and location, bridge location and milling instruction for affixing elements for attaching the secondary eyewear to primary eyewear 55, etc.

Step 285: editing the data related to the attaching elements (optional).

Optionally, manually editing data elements of the specific producing instruction data, the data elements selected from the group including: attaching elements type, drilling size and location, bridge location and milling instruction for affixing elements for attaching the secondary eyewear to primary eyewear 55.

Step 290: generating production instruction data.

Generating production instruction data in a form suitable for use by the production unit at the selected remote production site 184.

In embodiments of the present invention, scanning step 120 is used independently as a general editing procedure and a general procedure to correct distorted images.

An aspect of the present invention is to provide a method for selecting semi finished lenses, attaching elements and the positioning of the attaching elements, for producing secondary eyewear attachable to primary eyewear 55, the method including the steps of: (a) obtaining data defining the thickness, the inner curvature and the outer curvature of the lenses and the curvature of the frame of primary eyewear 55; (b) determining the thickness, the inner curvature, and the outer curvature of the lenses and the curvature of the frame of primary eyewear 55; (c) selecting a semi finished lenses best matching the determined curvature of the lenses of primary eyewear 55; and (d) selecting affixing elements for attaching the secondary eyewear, produced from the semi finished lenses, to primary eyewear 55, and the positioning of the attaching elements.

An aspect of the present invention is to provide a method for selecting drilling positions on the selecting semi finished lenses, for placing the bridge of the secondary eyewear. The location of the holes depends on the distance between the two lenses of primary eyewear 55, which can be determined by either:

a) Using the spatial distance of the contour segments to axis 525, as provided by data acquisition site 182;

b) Using the non-distorted front view image of primary eyewear 55; or c) Using two contour segments, each from a different lens, having the distance between the two contour data segments known.

In embodiments of the present invention, the method for determining the data defining the thickness, the inner curvature, and the outer curvature of the lenses and the curvature of the frame of primary eyewear 55, includes the step of scanning primary eyewear 55. The scanning provides data selected from the group including: one or more side view images from numerous positions around the frame of primary eyewear 55 frame, one or more segments outlining the curvature of the lenses and outer curvature of the lenses of primary eyewear 55, other data representing the frame local thickness d, other data representing the curvature of the surfaces of a lens of primary eyewear 55.

Reference is now made to FIGS. 15 and 16, which illustrate digital stylus 600 shown in FIG. 9, sensing outer curvature 52 and inner curvature 53, respectively, of a lens of primary eyewear 55.

In embodiments of the present invention, the scanning of primary eyewear 55 for selecting semi finished lenses includes the steps of: (a) placing eyewear 55 for scanning; (b) providing a moveable sensor for sensing spatial position, such as digital stylus 600; (c) moving sensor 600 along at least a portion of each surface (52, 53) of a lens of primary eyewear 55, thereby creating a curvature data segment, whereas the curvature data segment including the outer curvature and local thickness d of the lenses of primary eyewear 55; and (d) recording the determined curvature data segments of the lenses of primary eyewear 55. It should be noted that a guarding wheel 640, which is substantially round, can be added to tip 610 to prevent damaging the surface of the lens.

Figures 17, 18:
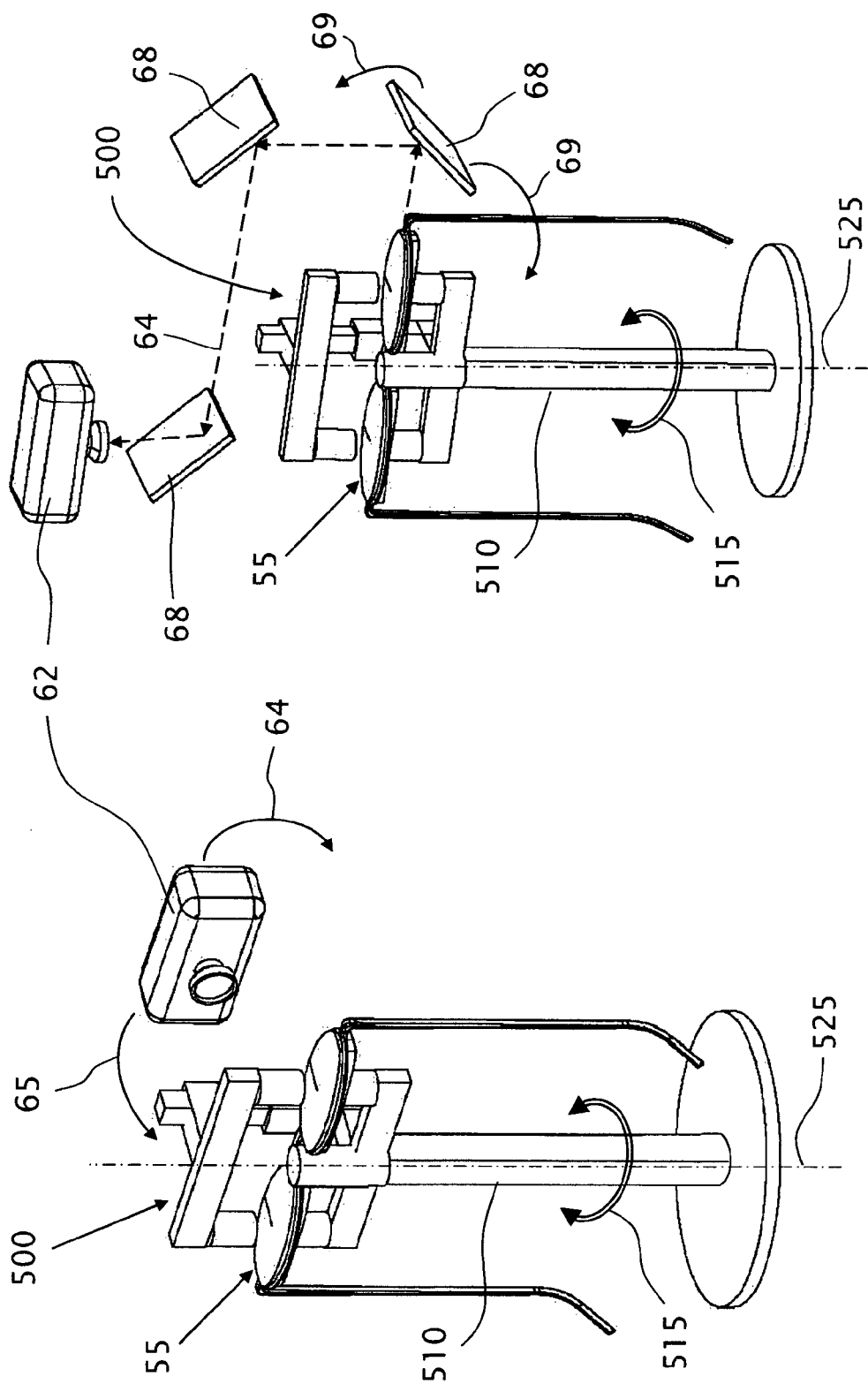
FIG. 17 illustrates the platform for holding the primary eyewear shown in FIG. 8, with a camera disposed to acquire side view (profile) images of the primary eyewear.
FIG. 18 illustrates the platform for holding the primary eyewear shown in FIG. 8, with a camera disposed to directly acquire front view images of the primary eyewear, capable of using folding mirrors to acquire side view (profile) images of the primary eyewear.

Reference is now made to FIG. 17, which illustrates platform 500 for holding primary eyewear 55, with camera 62 disposed to acquire side view (profile) image frames of primary eyewear 55. Reference is also made to FIG. 18, which illustrates the platform 500, with camera 62 disposed to directly acquire front view image frames of primary eyewear 55, and capable of using folding mirrors 68 to acquire side view (profile) image frames of primary eyewear 55. It should be noted that folding mirrors are given by way of example only and any other mechanism viewing and imaging the frame sides, such as optical prisms and optical fibers, can be used.

In embodiments of the present invention, the scanning of primary eyewear 55 for selecting semi finished lenses includes the steps of: (a) placing eyewear 55 for scanning; (b) providing an image sensor 62 for acquiring one or more image frames of the profile of each lens of primary eyewear 55; (c) acquiring one or more image frames of the profile of each lens of primary eyewear 55; (d) analyzing the image frames, thereby determining the outer curvature and local thickness d of the lenses and the curvature of the frame of primary eyewear 55; and (e) recording the determined outer curvature and local thickness d of the lenses of primary eyewear 55.

It should be noted that more than one image frame of each lens is need to determine the local outer curvature and local thickness d of the lenses. Hence, camera 62, in either setting, is moved around the frame of primary eyewear 55, to acquire numerous side view images from different positions. In embodiments of the present invention, post 510 of platform 500 is turned about the axis of post 510, between image acquisitions, in either of directions 515. In other embodiments of the present invention, camera 62 is moved in either of directions 65, between image acquisitions. Still, in other embodiments of the present invention, camera 62 is moved together with folding mirrors 68 in either of directions 69, between image acquisitions.

Figures 19, 20:
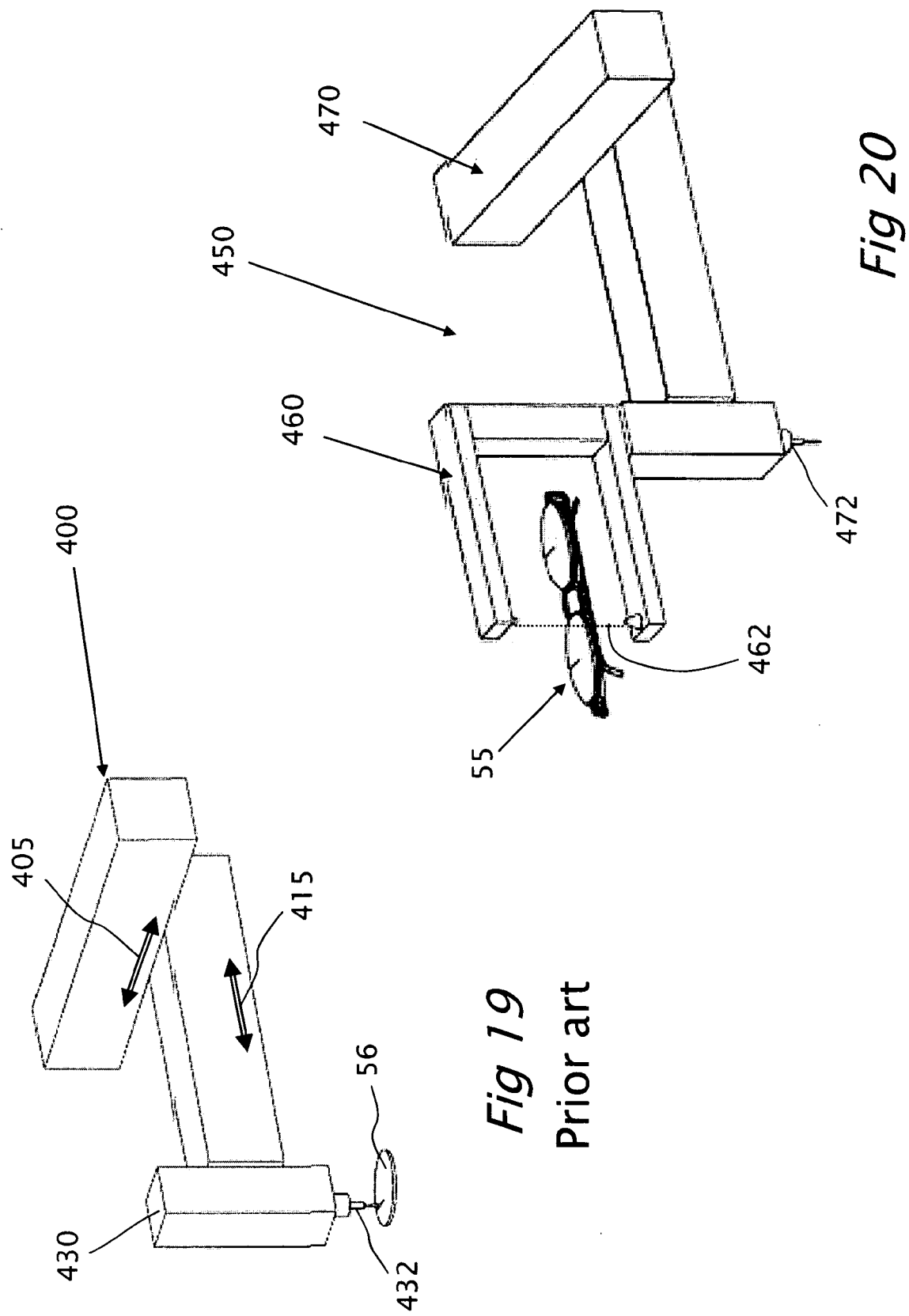
FIG. 19 (prior art) schematically illustrates a lens cutting machine.
FIG. 20 schematically illustrates a lens cutting machine integrated with a laser scanner.

It should be noted that production unit 400, disposed at a remote production site (184, 186) is design to cut semi finished lens, according to preset cutting instruction, performs just as similar machines in prior art. The production instructions data are provided by processing center 180 to production unit 400 in readable form, such as a computer file. FIG. 19 (prior art) schematically illustrates a lens cutting machine 400. Machine 400 includes an X-Y moving bench, capable in moving in directions 405 and 415, a head 430 and cutting mechanism 432 for cutting semi finished lens 56.

Figure 21:
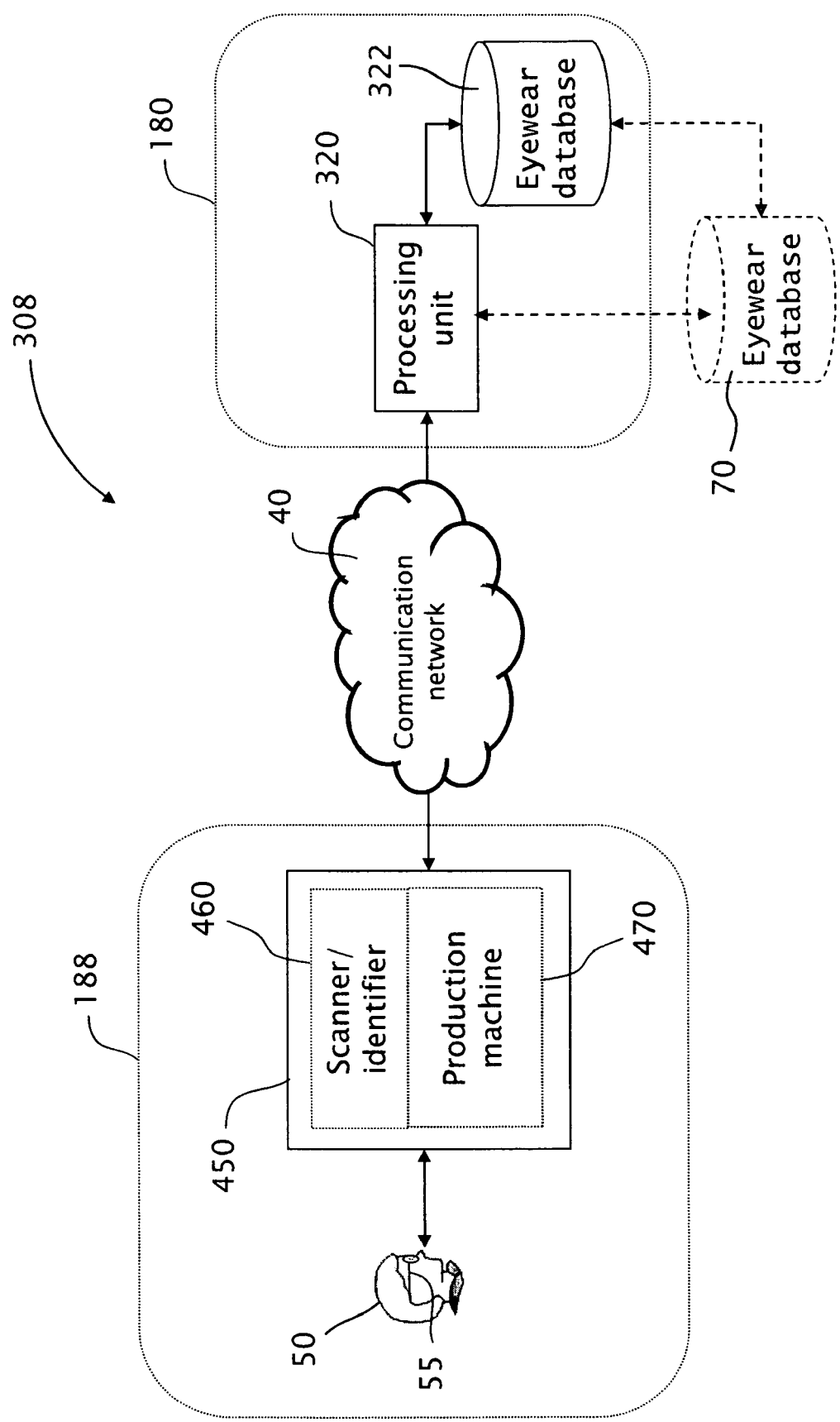
FIG. 21 is a block diagram of clip-on production system, according to embodiments of the present invention, whereas the scanner and the production machine are integrated.

An aspect of the present invention is to provide a device, at a site remotely located with respect to the data processing center, adapted to perform scanning of primary eyewear 55, and to produce secondary eyewear from semi finished lenses. Reference is made FIG. 20, which schematically illustrates a lens cutting machine integrated with a laser scanner. Integrated device 450 includes a lens cutting mechanism 470 and an eyewear scanning mechanism 460. Reference is also made to FIG. 21 is a block diagram of clip-on production system 308, according to embodiments of the present invention, whereas scanner unit 460 and production unit 470 are integrated into a single unit 450. Unit 450 is disposed at site 188, remotely located with reference to data processing center 180.

In embodiments of the present invention, the method for providing data regarding primary eyewear 55 to remote data processing center 180 further includes the step of providing data of other parts of the primary eyewear, whereas the parts are selected from the group including screws, bridge 57 (see FIG. 11) and ornaments.

In embodiments of the present invention, database of eyewear 322 at data processing center 180, includes eyewear frame entries of frames having one constant dimension and a scaling parameter associated with that dimension. The dimension is selected from the group consisting of: the height of the frame, the width of the frame, the width of the frame of a lens the primary eyewear 55. After extracting a matched frame, the dimensions of the extracted frame are manipulated according to the scaling associated with the extracted frame. Typically, eyeglasses frames of a particular shape are provided in three sizes. Hence, keeping just one entry for each frame shape, wherein the entry includes a scaling parameter, can save up to 66% of the database space.

In embodiments of the present invention, database of eyewear 322 includes multiple physical sub-databases, some of which may be located at data processing center site 180 and some maybe located at remote sites. Eyewear database 322 may further be connected to remote databases 70, such as databases of eyewear makers. In other embodiments of the present invention, database of eyewear 322 includes one or more physical sub-databases located at remote sites 70 only.

In embodiments of the present invention, processing center 180 controls the inventory of one or more production sites (184, 186, 188).

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A method for providing data regarding primary eyewear ("primary-eyewear-data") to a remote data processing center, where said primary-eyewear-data is processed and thereby generating production instructions for producing a clip-on for said primary eyewear, wherein said production instructions are provided to one or more remote production units, the method comprising:
    (a) scanning said primary eyewear, thereby obtaining data defining the shape and size of said primary eyewear suitable for obtaining therefrom at least one geometric characteristic of said primary eyewear;
    (b) providing to said processing center reference data associated with the primary eyewear, said reference data being representative of at least one reference dimension;
    (c) transmitting said reference data to said processing center;
    (d) generating at said processing center production instruction data for producing said clip-on based on said data defining the shape and size of said primary eyewear and said reference data; and
    (e) transmitting said production instruction data for producing said clip-on to said remote production unit,
wherein said data defining the shape and size of said primary eyewear is selected from the group including: one or more front view images, one or more segments outlining the outer contour of said frame, other data representing the frame local thickness, other data representing the curvature of the surfaces of a lens of said primary eyewear; and
wherein said generating said production instruction data at said processing center comprises the steps of:
    (a) providing a processing unit;
    (b) providing a database of eyewear frames;
    (c) providing at least one contour data segment, wherein said contour data segment defines at least one dimension of said frame of said primary eyewear, wherein said dimension is selected from the group consisting of: the height of said frame, the width of said frame, the width of the frame of a lens of said primary eyewear;
    (d) determining said dimension by said processing unit;
    (e) matching the location, size and shape of said at least one contour data segment with a database of frames defined by frame size and shape, wherein the match of said at least one contour data segment with each frame is graded;
    (f) computing a list of best matches in grading order, wherein said list length is delimited by a grade threshold, quantity of match, or any other method;
    (g) selecting the best match;
    (h) extracting form said eyewear database specific data needed for producing said clip-on, said specific producing data is selected from the group including: cutting contours, attaching elements type, drilling size and location, bridge location and milling instruction for affixing elements for attaching said clip-on to said primary eyewear;
    (i) manually editing data elements of said specific producing data selected from the group including: attaching elements type, drilling size and location, bridge location and milling instruction for affixing elements for attaching said clip-on to said primary eyewear; and
    (j) generating said production instruction data, wherein said instructions are selected from the group consisting of cutting instructions, attaching elements type, drilling instructions, milling instructions.

2. The method as in claim 1, wherein said processing center including:
    (a) a processing unit.

3. The method as in claim 1, wherein said processing center further including:
    (b) an eyewear database.

4. The method as in claim 1, wherein said reference data, further includes data defining the distance between the lenses of said primary eyewear.

5. The method of claim 1, wherein said production instruction data is provided as a computer file, readable by said remote production unit.

6. The method of claim 1, wherein said data defining the shape and size of said primary eyewear, is selected from an eyewear database.

7. The method of claim 6, wherein said generating said production instruction data at said processing center comprises the steps of:
    (a) providing an eyewear database;
    (b) extracting form said eyewear database specific data needed for producing said clip-on, said specific producing data is selected from the group including: cutting contours, attaching elements type, drilling size and location, bridge location and milling instruction for affixing elements for attaching said clip-on to said primary eyewear; and
    (c) generating said production instruction data, wherein said instructions are selected from the group consisting of cutting instructions, attaching elements type, drilling instructions, milling instructions.

8. The method of claim 6, wherein said generating said production instruction data at said processing center comprises the steps of:
    (a) providing an eyewear database;
    (b) extracting form said eyewear database specific data needed for producing said clip-on, said specific producing data is selected from the group including: cutting contours, attaching elements type, drilling size and location, bridge location and milling instruction for affixing elements for attaching said clip-on to said primary eyewear;
    (c) manually editing data elements of said specific producing data selected from the group including: attaching elements type, drilling size and location, bridge location and milling instruction for affixing elements for attaching said clip-on to said primary eyewear, and
    (d) generating said production instruction data, wherein said instructions are selected from the group consisting of cutting instructions, attaching elements type, drilling instructions, milling instructions.

9. The method of claim 1, wherein said scanning of said primary eyewear comprises the steps of:
    (a) placing the eyewear for scanning;
    (b) providing a moveable sensor capable of sensing spatial position, such as electronic stylus;
    (c) moving said sensor along at least a portion of the external edge of the frame of said primary eyewear, thereby creating a contour data segment, wherein said contour data segment comprising location, size and shape data; and
    (d) recording said contour segment location, size and shape data.

10. The method of claim 9, wherein when more than one contour data segments are created, each contour data segment further comprises distance data from adjacent contour data segment.

11. The method of claim 9, further includes the step of providing data defining the distance between the lenses of said primary eyewear.

12. The method of claim 11, wherein said data defining the distance between said lenses is obtained from said front view image of said primary eyewear.

13. The method of claim 11, wherein said data defining the distance between said lenses is obtained from contour data segments operatively taken from each of said lenses, and wherein the distance between said two contour data segments is measured and recorded.

14. The method of claim 1, further comprises the step of providing data of other parts of said primary eyewear, wherein said parts are selected from the group including screws, a bridge and ornaments.

15. The method of claim 1, wherein said transmitting of said reference data to said processing center is performed by external communication means selected from the group including: electronic mail, computer network, facsimile machine, radio frequency (RF) devices such as cellular phones and Bluetooth, regular mail.

16. The method of claim 1, wherein said generating said production instruction data at said processing center comprises the steps of:
(a) aligning said contour data segments with said front view image of said primary eyewear, wherein said alignment is performed by applying graphical processing manipulation tools on said front view image, said graphical processing is selected from the group of graphical actions including translation, scaling, rotation, skewing and any other graphical actions, thereby creating a non-distorted image of said primary eyewear,
(b) manually completing the external outline of said frame of said primary eyewear using said non-distorted image; and
(c) generating said production instruction data, wherein said instructions are selected from the group consisting of cutting instructions, attaching elements type, drilling instructions, milling instructions.

17. The method of claim 1, wherein said generating said production instruction data at said processing center comprises the steps of:
(a) aligning said contour data segments with said front view image of said primary eyewear, wherein said alignment is performed by applying graphical processing manipulation tools on said front view image, said graphical processing is selected from the group of graphical actions including translation, scaling, rotation, skewing and any other graphical actions, thereby creating a non-distorted image of said primary eyewear,
(b) manually completing the external outline of said frame of said primary eyewear using said non-distorted image;
(c) manually adding production data selected from the group including drilling attaching elements type, size and location instruction, bridge location and milling instruction for affixing elements for attaching said clip-on to said primary eyewear; and
(d) generating said production instruction data, wherein said instructions are selected from the group consisting of cutting instructions, attaching elements type, drilling instructions, milling instructions.

18. The method of claim 1, wherein said transmitting of said production instruction data to said remote production unit is performed by external communication means selected from the group including: electronic mail, computer network, facsimile machine, radio frequency (RF) devices such as cellular phones and Bluetooth, regular mail.

19. The method of claim 1, wherein said data defining the shape and size of said primary eyewear is adapted to be manipulated at least at said processing center so that said clip-on will be produced having shape and size adaptive to the shape, curvature and size of said primary eyewear.

20. A method for editing scanned data of a primary eyewear for generating production instructions for a clip-on for said primary eyewear, the method comprising the steps of:
(a) providing a scanning unit, wherein said scanning unit obtains data defining the shape and size of said primary eyewear suitable for obtaining therefrom at least one geometric characteristic of said primary eyewear; and
(b) providing a processing unit for processing said reference data associated with the primary eyewear and thereby generating production instructions of clip-on object for the primary eyewear, wherein said processing comprising the steps of:
  i) providing a database of eyewear frames;
  ii) providing at least one contour data segment, wherein said contour data segment defines at least one dimension of said frame of said primary eyewear, wherein said dimension is selected from the group consisting of: the height of said frame, the width of said frame, the width of the frame of a lens of said primary eyewear,
  iii) determining said dimension by said processing unit;
  iv) matching the location, size and shape of said at least one contour data segment with a database of eyewear frames defined by frame size and shape, wherein the match of said at least one contour data segment with each frame is graded;
  v) computing a list of best matches in grading order, wherein said list length is delimited by a grade threshold, quantity of match, or any other method; and
  vi) selecting the best match.

21. The method as in claim 20, wherein said reference data, further includes data defining the distance between the lenses of said primary eyewear.

22. The method of claim 20, wherein said database of eyewear frames comprises eyewear frame entries of frames having one constant dimension and a scaling parameter associated with said dimension.

23. The method of claim 1, wherein said database of eyewear frames comprises eyewear frame entries of frames having one constant dimension and a scaling parameter associated with said dimension.

* * * * *